J. W. STEPHENSON.
AXLE BEARING DEVICE FOR CARS.
APPLICATION FILED AUG. 6, 1908.

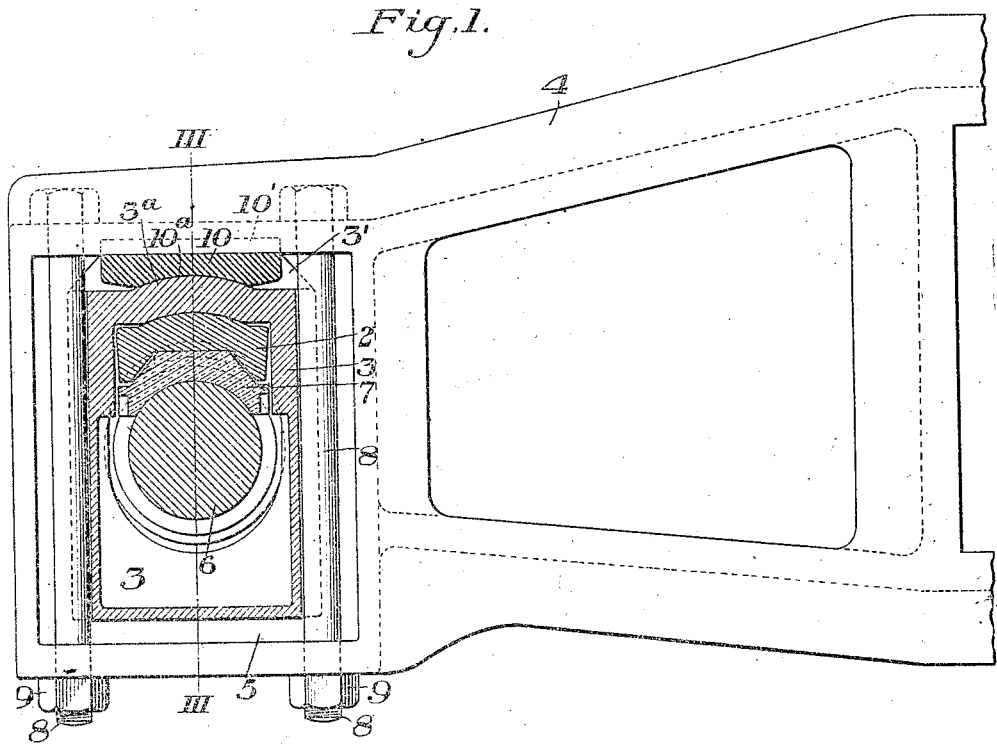
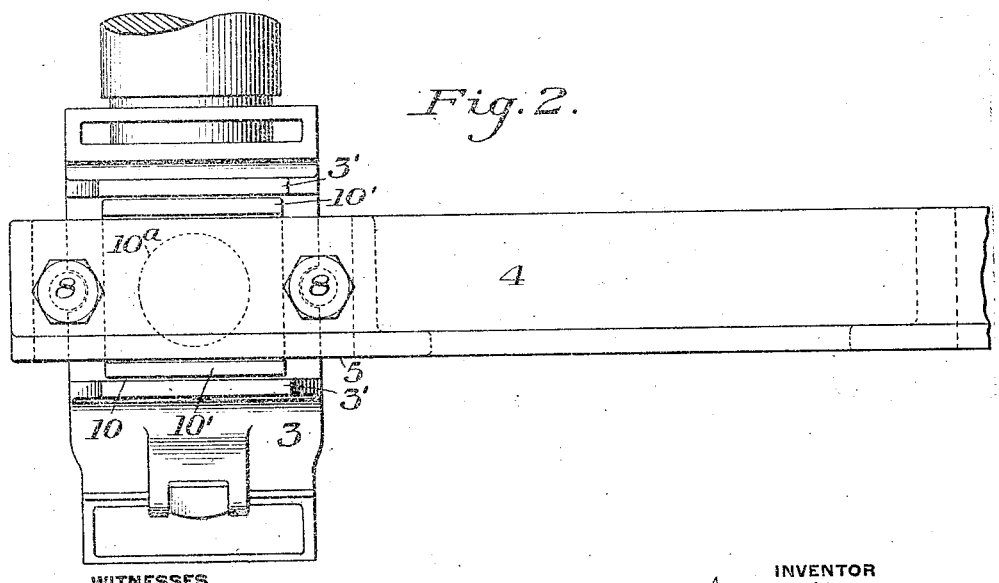

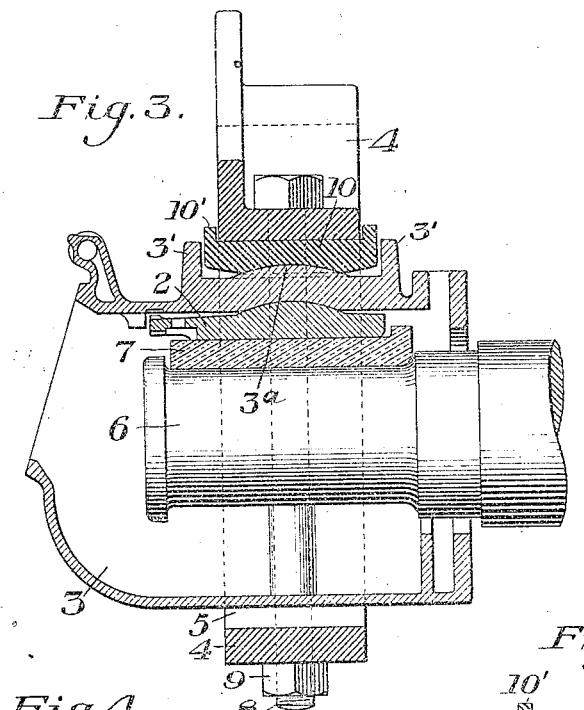
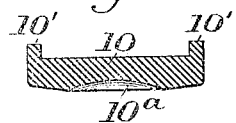
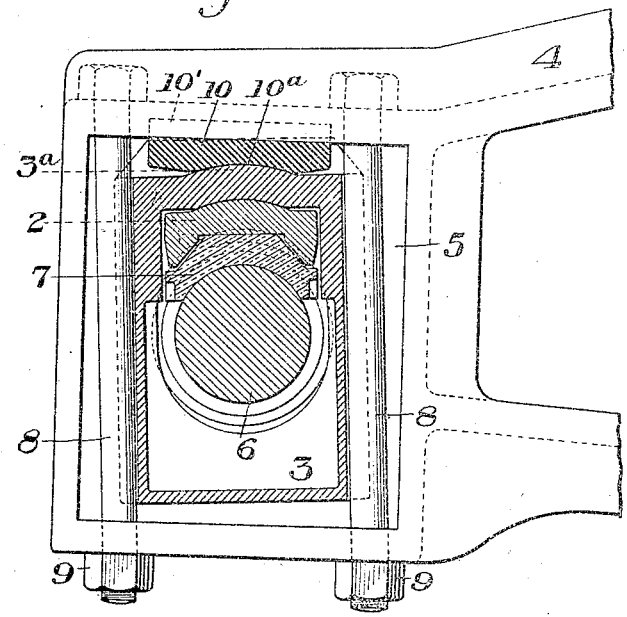
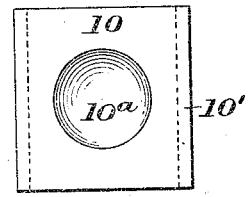

931,658.

Patented Aug. 17, 1909.
4 SHEETS—SHEET 3.

WITNESSES
R A Balderson
W.W. Burris

INVENTOR
John W Stephenson

J. W. STEPHENSON.
AXLE BEARING DEVICE FOR CARS.
APPLICATION FILED AUG. 6, 1908.

931,658.

Patented Aug. 17, 1909.
4 SHEETS—SHEET 4.

WITNESSES
R A Balderson
W W Smith

INVENTOR
John W. Stephenson
by Bakewell Byrnes & Parmelee
his attys

UNITED STATES PATENT OFFICE.

JOHN W. STEPHENSON, OF TOLEDO, OHIO, ASSIGNOR TO THE NATIONAL MALLEABLE CASTINGS COMPANY, OF CLEVELAND, OHIO, A CORPORATION OF OHIO.

AXLE-BEARING DEVICE FOR CARS.

No. 931,658.   Specification of Letters Patent.   Patented Aug. 17, 1909.

Application filed August 6, 1908. Serial No. 447,294.

*To all whom it may concern:*

Be it known that I, JOHN W. STEPHENSON, of Toledo, in the county of Lucas, State of Ohio, have invented a new and useful Axle-Bearing Device for Cars, of which the following is a specification, reference being had to the accompanying drawings, forming part of this specification, in which—

Figure 7:
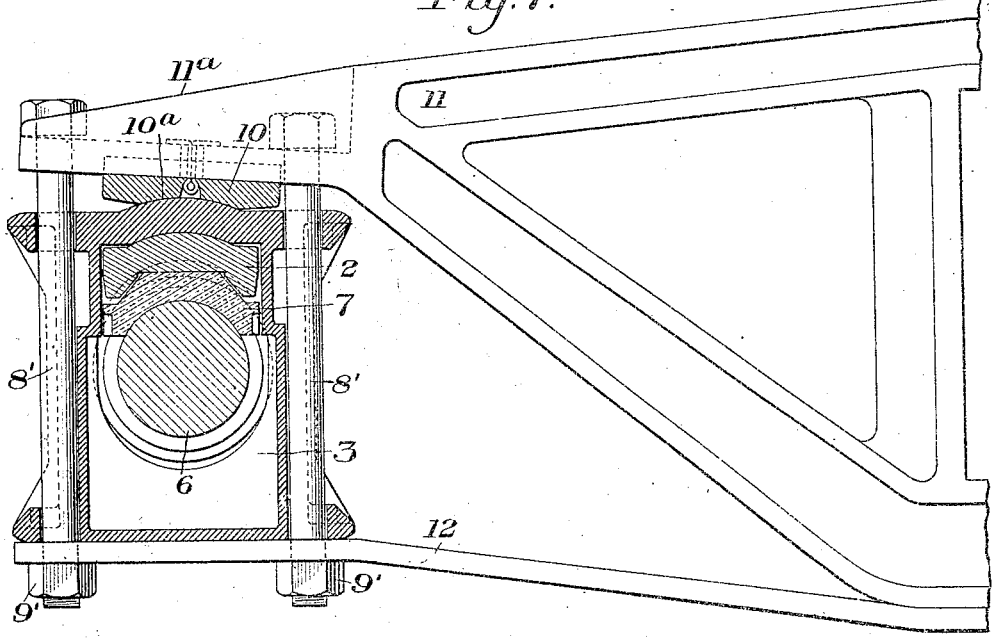
Figure 8:
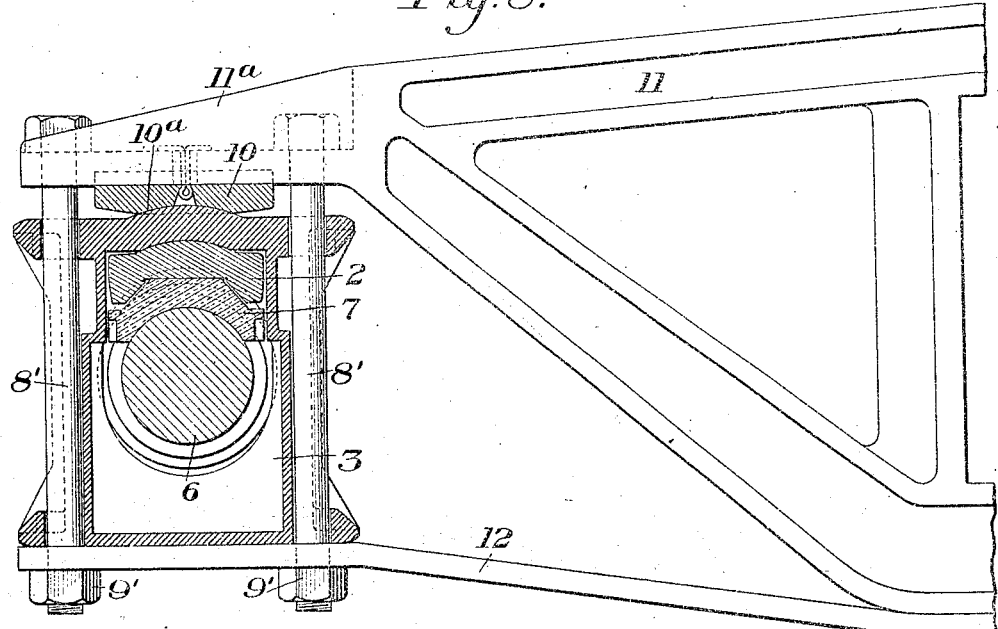
Figure 9:
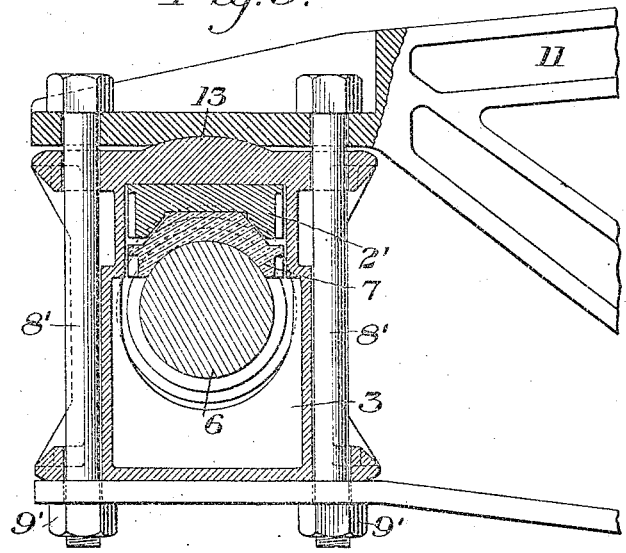
Figure 10:
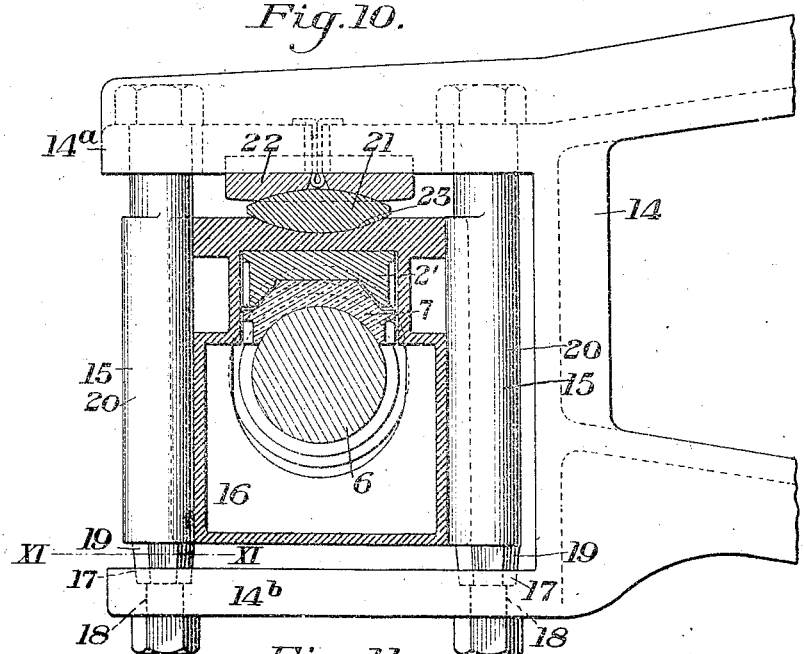
Figure 11:
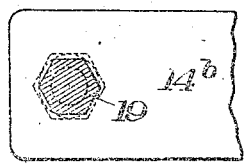

Figure 1 is a cross-section of a journal box secured in place in a truck side frame, and illustrating the bearing device; Fig. 2 is a plan view of the parts shown in Fig. 1; Fig. 3 is a longitudinal section through the journal box and frame, on the line III—III of Fig. 1; Fig. 4 is a view similar to Fig. 1, but showing the journal box out of alinement with the vertical walls of the truck side frame; Fig. 5 is a sectional detail of the compensator block; and Fig. 6 is a bottom plan view of the same. Figs. 7 and 8 are views similar to Fig. 7, and illustrating the box applied to a built-up frame, and in different positions; Figs. 9 and 10 are similar views showing other modifications; and Fig. 11 is a detail sectional view on the line XI—XI of Fig. 10.

The purpose of my invention is to provide means for placing of journal boxes in the side frames of railway cars. Where the side frame is made of a single casting having an opening for the reception of a journal box it often happens that the space in the side frame which receives the journal box is warped and untrue, and the journal box itself may also be warped and untrue. In either of such cases the flat top of the journal box and the flat under side of the side frame coming together will tilt the journal box out of its proper vertical position so that it cannot be properly held. This difficulty also exists in built-up truck frames. This is a serious difficulty, but it is corrected by my invention.

In the accompanying drawings, 4 is the truck side frame which I show cast in a single piece, having at the ends openings 5 to receive the journal box 3.

6 is the car axle journal, 7 is the journal brass, 2 is the wedge, and 8, 8 are the bolts which pass through the top and bottom members of the side frame for the purpose of holding the journal box in place. These bolts may be secured by nuts 9 and the holes in the side frame which receive the bolts may be drilled after the side frame has been cast, or they may be formed by coring in making the casting for the side frame.

To provide for inequalities in the journal box or in the side frame, and to enable the journal box always to assume a vertical position parallel with the bolts 8, 8, I provide a compensator which I show in the form of a cast block or plate of metal 10 having lateral flanges 10′ by which it is confined in position against the top member of the side frame. The lower face of this compensator has a socket 10$^a$ of spherical form which is adapted to match with a ball-shaped projection 3$^a$ on the top of the journal box 3, so that if the box opening in the side frame should be irregular, or of the top of the journal box should be irregular, the journal box will adjust itself on the rocking bearing provided by this ball and socket formation, and although the top of the journal box may not be parallel with the under side of the top member of the side frame, the journal box will be perpendicular and will be parallel with the confining bolts 8. The journal box will thus be held in the side frame without strain, and will be properly positioned. This I illustrate in Fig. 4 in which I show a side frame of very irregular form, the bolts 8, 8 being perpendicular but out of parallel with vertical members of the truck side-frame, and the top of the journal box being seated against the compensator 10 and being enabled thereby to be maintained by the bolts in perfect equilibrium.

The top of the journal box is preferably provided with vertical flanges 3′ which embrace the sides of the compensating piece. The device is also preferably used with a ball and socket connection between the wedge 2 and the interior surface of the top of the journal box, although these parts are not essential to my invention as broadly claimed.

In Figs. 7 and 8 I have shown my invention as applied to a truck side frame composed of two members 11 and 12, between which the box is seated and having an open seat for the journal box. Fig. 7 shows the application where the side frame has been distorted in its manufacture, while Fig. 8 shows the application where the side frame is without distortion. The construction and arrangement of the parts constituting the invention is substantially the same as in the form first described, and corresponding reference characters are applied to the corresponding parts. The bolts 8' pass through the side frame extension 11ᵃ and through the bottom member 12, which is shown as consisting of a wrought tie-bar.

In the modification shown in Fig. 9, the compensator 10 is omitted and a ball and socket joint or bearing 13 is formed between the top of the box and the extension of the side frame, and the ball and socket connection between the wedge 2', and the top of the journal box is omitted, the wedge having a flat bearing against the journal box.

Fig. 10 shows another modification in which the side frame 14 is an integral piece without outside connection between its upper and lower extensions 14ᵃ and 14ᵇ, thereby leaving an opening for the insertion and removal of the journal box and axle without pulling the side frame from the truck. 15 are the bolts which secure the journal box 16. The bolt-holes at the lower extension 14ᵇ are of angular, preferably hexagonal form, and of larger diameter at their upper portions 17 than at their lower portions 18. The portion 19 of the bolts which fit in these holes are made of corresponding form. The middle portions 20 of these bolts which engage the sides of the journal box are round, but are of larger diameter than the end portions and are of eccentric or cam form. In assembling, the proper position of the axle in the truck is determined, and the journal box is then placed in its true position. The bolts are then turned into proper position to hold this box in this position, and are held in their adjustment by the engagement of their hexagonal portions with the holes in the extension 14ᵇ. In this manner, the position of the journal box is determined, not by the bolt-holes in the side frame but by the adjusted position of the bolts. If the axle is out of its true position, the bolts can be loosened, raised, and readjusted so as to move the journal box nearer to or farther away from, the center of the truck. Fig. 10 also shows a bearing pin 21 of elliptical or lenticular cross-section, its upper convex surface filling a concave bearing in the compensator 22 and its lower convex surface bearing in a concavity 23 on the top of the journal box. The construction shown in this figure is also applicable to non-integral side frames.

It will be understood by those skilled in the art, that various other changes and modifications may be made, and that the ball-and-socket bearing may be formed in various ways; also that the invention is applicable to side frames of various constructions as well as to the particular forms shown.

I claim:—

1. An arch bar side frame for trucks, having a journal box seat, and a box normally fixedly held in said seat against angular movement, the box having a rocking bearing between it and the top member of the side frame to permit initial adjustment of the box to a vertical position in the direction of the length of the truck to irregularities of construction, substantially as described.

2. An arch bar side frame for trucks having a journal box opening, a rocking bearing between the top of the journal box and the top member of the frame to permit initial adjustment of the box in the direction of the length of the truck, and means for normally securing the box fixedly in its adjusted position, substantially as described.

3. The combination of a journal box and truck side frame of the arch-bar type, a compensating piece interposed between the side frame and the journal box and having a rocking bearing on the journal box in the direction of the length of the truck, together with securing means for normally holding the box fixedly in its adjusted position with respect to angular movement, substantially as described.

4. The combination of a journal box and truck side frame of the arch-bar type, a compensating piece interposed between the side frame and the journal box and having a rocking bearing on the journal box in the direction of the length of the truck, said rocking bearing being formed by a ball on one of the parts and a socket on the other, together with securing means for the box which normally confine it against lateral movement, substantially as described.

5. The combination of a truck side-frame and journal box, the journal box having a rocking bearing at its top, to permit an initial adjustment of the box in the side frame, means for holding the box in its initially adjusted position, and a journal brass and wedge, the wedge having a rocking bearing against the journal box, substantially as described.

6. A truck side frame having an open seat for a journal box, a journal box seated therein, and means for securing the journal box in its seat and for adjusting the same longitudinally toward and away from the center of the truck; substantially as described.

7. A truck side frame having an open seat for a journal box, a journal box seated therein, and means for securing the journal box in its seat and for adjusting the same toward and away from the center of the truck, the box having a rocking bearing at its top; substantially as described.

8. A truck side-frame having an open seat for a journal box, and cam bolts for securing the box therein, said bolts being adjustable to change the position of the boxes; substantially as described.

9. A truck-side-frame having an open seat at its end for a journal box, and adjusting and securing bolts extending vertically at each side of the seat, said bolts having cam or eccentric portions engaging the sides of the box, and means for securing said bolts in their adjusted positions; substantially as described.

10. A truck side-frame having an open seat for a journal box, and cam bolts for securing the box therein, said bolts being adjustable to change the position of the boxes, the box having a rocking bearing at its top; substantially as described.

11. An arch bar side frame for car trucks having a journal box seat, a journal box having a rocking bearing in its seat to permit an initial adjustment of the box in the direction of the length of the truck to a perpendicular position, and journal box bolts engaging the sides of the box and holding it in its adjusted position, substantially as described.

12. An arch bar side frame for car trucks having a journal box seat, a journal box having a rocking bearing in its seat to permit an initial adjustment of the box to a perpendicular position, and journal box bolts engaging the sides of the box and holding it in its adjusted position, together with means for permitting a longitudinal adjustment of the box in its seat, substantially as described.

13. An arch-bar side frame for car trucks having an opening for a journal box of greater width than the box, a journal box having a rocking bearing in its seat to permit it to assume an initial vertical position in said opening, and means for fixedly securing the box in its adjusted position; substantially as described.

14. An arch-bar side frame for car trucks having an opening for a journal box of greater width than the box, a journal box having a rocking bearing in its seat to permit it to assume an initial vertical position in said opening, and bolts engaging the sides of the box and securing it in its adjusted position, substantially as described.

In testimony whereof, I have hereunto set my hand.

JOHN W. STEPHENSON.

Witnesses:
J. J. MANNING,
J. V. DAVISON.